(12) United States Patent
Kiso (10) Patent No.: US 11,274,574 B2
(45) Date of Patent: Mar. 15, 2022

(54) CARBON-BASED FUEL GASIFICATION POWER GENERATION SYSTEM

(71) Applicant: Mitsubishi Power, Ltd., Yokohama (JP)

(72) Inventor: Fumihiko Kiso, Yokohama (JP)

(73) Assignee: Mitsubishi Power, Ltd., Yokohama (JP)

( * ) Notice: Subject to any disclaimer, the term of this patent is extended or adjusted under 35 U.S.C. 154(b) by 46 days.

(21) Appl. No.: 16/994,279

(22) Filed: Aug. 14, 2020

(65) Prior Publication Data

US 2021/0062683 A1 Mar. 4, 2021

(30) Foreign Application Priority Data

Aug. 28, 2019 (JP) .............................. JP2019-155361

(51) Int. Cl.
  *F01K 23/06* (2006.01)
  *F02C 3/28* (2006.01)
  *C10J 3/84* (2006.01)

(52) U.S. Cl.
  CPC .............. *F01K 23/067* (2013.01); *C10J 3/84* (2013.01); *F02C 3/28* (2013.01); *C10J 2200/15* (2013.01);
  (Continued)

(58) Field of Classification Search
  CPC ... F02C 3/28; F02C 3/00; Y02E 20/18; Y02E 20/14; Y02E 20/16; C10J 2300/1671;
  (Continued)

(56) References Cited

U.S. PATENT DOCUMENTS

| 4,002,565 A * | 1/1977 | Farrell ............... B01D 53/1418 210/750 |
| 4,150,953 A | 4/1979 | Woodmansee |
| 4,566,267 A | 1/1986 | Müller et al. |

(Continued)

FOREIGN PATENT DOCUMENTS

| EP | 0 503 773 A2 | 9/1992 |
| JP | 2013-241923 A | 12/2013 |

(Continued)

OTHER PUBLICATIONS

Russian-language Office Action issued in Russian Application No. 2020127957 dated Jun. 16, 2021 with English translation (12 pages).

(Continued)

*Primary Examiner* — Imran Akram
(74) *Attorney, Agent, or Firm* — Crowell & Moring LLP (57) ABSTRACT

A carbon-based fuel gasification power generation system is configured to remove ammonia from syngas using washing water, and effectively use the ammonia-containing washing water. The system includes a gasification facility provided with a water scrubber for removing ammonia in the syngas generated as gasified carbon-based fuel, and a power generation facility provided with a combustor for burning gas for combustion generated in the gasification facility and air for combustion humidified in the humidifying tower, and a gas turbine driven by combustion gas. The ammonia-containing water recovered in the water scrubber is supplied to the humidifying tower. Using the water, compressed air to be supplied to the combustor is humidified.

11 Claims, 4 Drawing Sheets

(52) U.S. Cl.
CPC .. *C10J 2300/169* (2013.01); *C10J 2300/1671* (2013.01); *C10J 2300/1807* (2013.01)

(58) Field of Classification Search
CPC .................. C10J 2300/169; C10J 2300/1807; C10J 3/84; C10J 2300/1606; C10J 2300/165; C10J 2300/1653; C10J 3/00; C10K 1/101; C10K 3/04
See application file for complete search history.

(56) References Cited

U.S. PATENT DOCUMENTS

| | | | | |
|---|---|---|---|---|
| 4,693,883 | A * | 9/1987 | Fleming | C01C 1/12 252/373 |
| 5,198,103 | A * | 3/1993 | Meyer | C10G 1/002 208/431 |
| 6,282,880 | B1 * | 9/2001 | Wallace | C01C 1/0488 60/780 |
| 2004/0247509 | A1 * | 12/2004 | Newby | C10K 1/20 423/240 S |
| 2008/0147241 | A1 * | 6/2008 | Tsangaris | C03B 5/025 700/273 |
| 2014/0216308 | A1 * | 8/2014 | Eden | F23G 7/065 110/252 |
| 2014/0356238 | A1 * | 12/2014 | Seiki | C10K 3/04 422/162 |
| 2014/0356267 | A1 * | 12/2014 | Hunwick | B01D 53/96 423/220 |
| 2016/0045841 | A1 * | 2/2016 | Kaplan | B01D 53/48 429/49 |
| 2017/0197827 | A1 * | 7/2017 | Ravikumar | C10K 3/04 |
| 2021/0164001 | A1 * | 6/2021 | Al Rowaihi | C12N 1/20 |
| 2021/0284927 | A1 * | 9/2021 | Chiron | C10K 3/04 |

FOREIGN PATENT DOCUMENTS

| | | |
|---|---|---|
| RU | 2 387 847 C1 | 4/2010 |
| SU | 1309919 A3 | 5/1987 |

OTHER PUBLICATIONS

Russian-language Search Report issued in Russian Application No. 2020127957 dated Jun. 10, 2021 with English translation (four (4) pages).

* cited by examiner

FIG. 4

CARBON-BASED FUEL GASIFICATION POWER GENERATION SYSTEM

CLAIM OF PRIORITY

The present application claims priority from Japanese Patent application serial no. 2019-155361, filed on Aug. 28, 2019, the content of which is hereby incorporated by reference into this application.

BACKGROUND OF THE INVENTION

The present invention relates to a carbon-based fuel gasification power generation system.

One of recently proposed gasification power generation system is configured to partially oxidize the carbon-based fuel such as coal, biomass, and heavy oil in a gasifier to provide syngas mainly composed of carbon monoxide and hydrogen, and remove particulates, halogens, and ammonia from the syngas for generating gas for combustion, which is supplied to a gas turbine combustor (hereinafter referred to as a combustor).

Another proposed gasification power generation system includes a gas turbine using highly humidified air, which is configured to exchange heat between water-containing air for combustion supplied to the combustor and exhaust gas from the gas turbine, increase a temperature of the water-containing air for combustion, and supply the water-containing air for combustion at the increased temperature to the combustor.

For the purpose of preventing global warming, the carbon-based fuel gasification power generation system is configured to recover carbon dioxide. The shift reaction process has been proposed for making carbon monoxide reacted with steam for conversion into hydrogen and carbon dioxide.

Furthermore, a method called direct quench has been under development. Specifically, in the method, water is sprayed to the high-temperature syngas at an outlet side of the gasifier so that a steam concentration in the syngas is increased.

An example of a background of the above-described technology includes Japanese Patent Laid-Open No. 2013-241923 (Patent Literature 1). In the disclosure, a carbon-based fuel gasification power generation system includes a gasifier for deriving syngas from the carbon-based fuel, a heat recovery section of the gasifier for recovering heat from the syngas, a cooling tower for cooling the syngas, a shift reactor which makes the carbon monoxide in the syngas reacted with steam for conversion into carbon dioxide and hydrogen, an absorber in which absorbent absorbs hydrogen sulfide contained in the syngas circulating through the shift reactor, a combustor for generating combustion gas using the fuel as the syngas with hydrogen sulfide removed, a gas turbine driven by the combustion gas, a water recovery device for recovering water by cooling exhaust gas from the gas turbine, and a humidifying tower that sprays water recovered by the water recovery device to air for combustion, which is supplied to the combustor for humidification. The system further includes a cooling water supply system that supplies water recovered by the water recovery device as the cooling water to any one of the gasifier, a heat recovery section of the gasifier, and the cooling tower (see description in SUMMARY).

SUMMARY OF THE INVENTION

Japanese Patent Laid-Open No. 2013-241923 discloses the carbon-based fuel gasification power generation system required to execute the process of removing particulates, halogens, and ammonia.

In the disclosure, there is no description on removal of ammonia from the syngas using washing water nor effective use of the ammonia-containing washing water.

The present invention provides the carbon-based fuel power generation system configured to remove ammonia from the syngas using the washing water, and effectively use the ammonia-containing washing water.

The carbon-based fuel gasification power generation system according to the present invention includes a gasifier for gasifying carbon-based fuel using an oxidizer to provide syngas containing carbon monoxide and hydrogen, a dust remover disposed downstream from the gasifier for removing particulates in the syngas, a first water scrubber disposed downstream from the dust remover for removing halogens in the syngas, a shift reactor disposed downstream from the first water scrubber for partially converting carbon monoxide in the syngas into hydrogen, a second water scrubber disposed downstream from the shift reactor for removing ammonia in the syngas, and discharging water containing ammonia, an absorber disposed downstream from the second water scrubber for removing hydrogen sulfide and carbon dioxide in the syngas, and generating gas for combustion, a compressor for compressing air to generate compressed air, a humidifying tower for humidifying the compressed air to generate air for combustion, a combustor for burning the gas for combustion and the air for combustion to generate combustion gas, a gas turbine driven by the combustion gas generated by the combustor, and a generator connected to the gas turbine. A water supply pipe arrangement extending from the second water scrubber to the humidifying tower is provided to supply the water containing ammonia from the second water scrubber to the humidifying tower.

The present invention provides the carbon-based fuel power generation system configured to remove ammonia from the syngas using the washing water, and effectively use the ammonia-containing washing water.

Problems, structures, and advantageous effects other than those described above will be clarified by descriptions of the following examples.

DETAILED DESCRIPTION OF THE PREFERRED EMBODIMENTS

Hereinafter, an explanation will be made on examples according to the present invention with reference to the drawings. The same or substantially the same structures will be designated with the same codes, and repetitive explanations thereof will be omitted.

First Example

An explanation will be made on a carbon-based fuel gasification power generation system as a first example.

Figure 1:
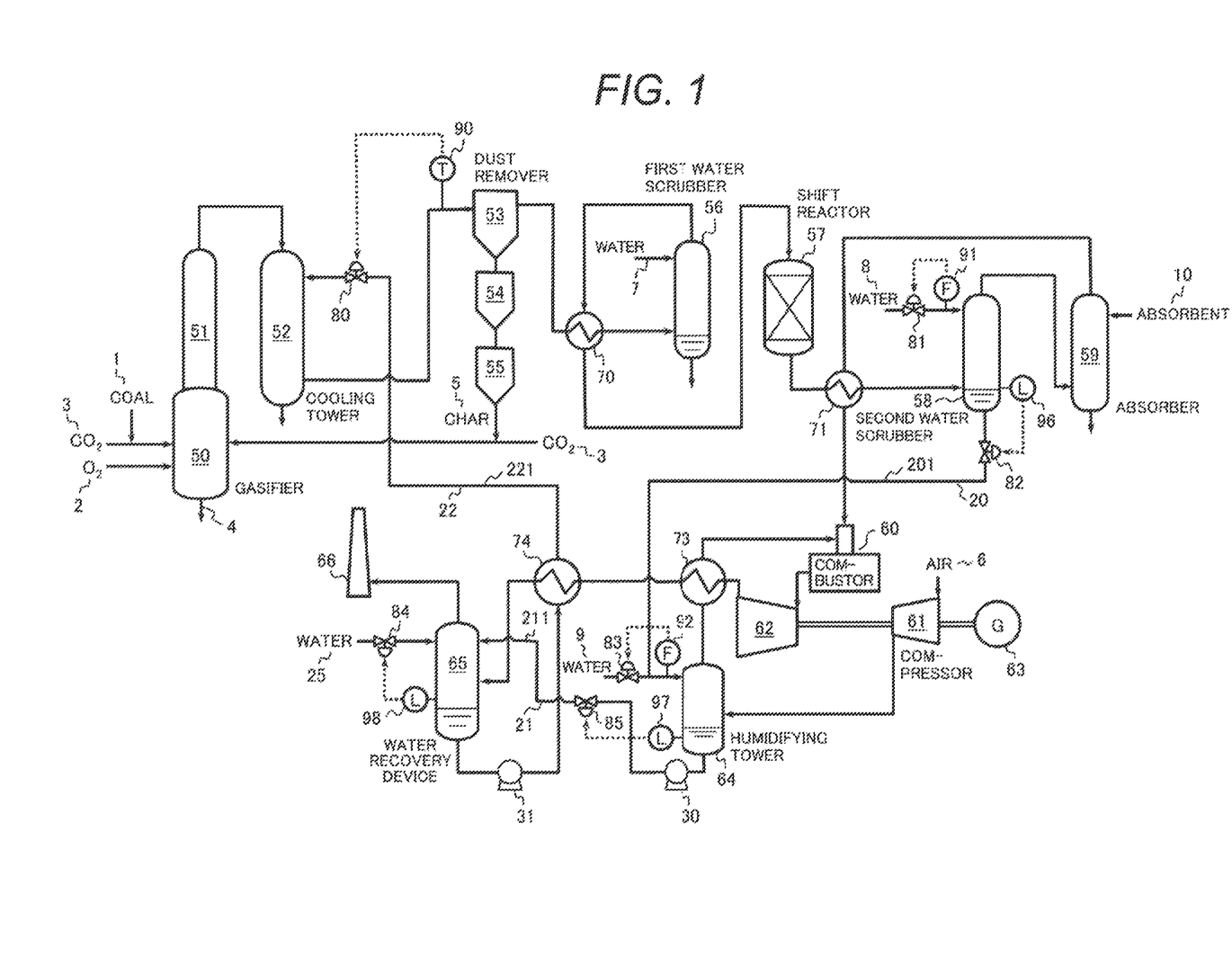
FIG. 1 is a diagram illustrating a system structure of a carbon-based fuel gasification power generation system according to a first example.

FIG. 1 is a diagram illustrating a system structure of the carbon-based fuel gasification power generation system according to the first example.

The carbon-based fuel gasification power generation system according to the first example includes a gasification facility for gasifying the carbon-based fuel, and a power generation facility for generating power using syngas derived from the gasification facility, which is mainly composed of carbon monoxide and hydrogen (gas for combustion).

The gasification facility includes a gasifier 50, a cooling tower (water spraying facility) 52, a dust remover (dust removing facility) 53, a first water scrubber 56, a shift reactor 57, a second water scrubber 58, and an absorber 59.

The power generation facility includes a combustor 60, a gas turbine (expansion turbine) 62, a generator 63, a water recovery device (water recovery facility) 65, a compressor 61, and a humidifying tower 64.

The carbon-based fuel gasification power generation system according to the first example includes the gasification facility and the power generation facility. The gasification facility includes the second water scrubber 58 for removing ammonia in the syngas derived from gasifying the carbon-based fuel. The power generation facility includes the combustor 60 for generating the combustion gas using gas for combustion as the fuel, generated by the gasification facility, and the gas turbine 62 driven by the combustion gas. The power generation facility includes the humidifying tower 64 for humidifying compressed air as air for combustion, which is supplied to the combustor 60.

The power generation facility includes the combustor 60 for generating the combustion gas using air and gas for combustion, the gas turbine 62 driven by the combustion gas derived from the combustor 60, and the humidifying tower 64 for humidifying compressed air to be supplied to the combustor 60.

The compressed air is humidified by ammonia-containing water 20 which has been recovered by the second water scrubber 58 and fed to the humidifying tower 64, and further supplied to the combustor 60.

The system according to the first example employs coals 1 as the carbon-based fuel, and oxygen 2 as an oxidizer. The finely pulverized coal 1 is supplied to the gasifier 50 while being carried by carbon dioxide 3. In other words, the coal 1 and oxygen 2 will be supplied to the gasifier 50 while being carried by the carbon dioxide 3.

In the gasifier 50, the coal 1 is made reacted with oxygen 2 (partial oxidization) to generate carbon monoxide and hydrogen, resulting in the syngas containing carbon monoxide and hydrogen. Ash contained in the coal 1 will be discharged as a molten slag 4 from the gasifier 50. The gasifier 50 is configured to gasify the carbon-based fuel using the oxidizer, and provides the syngas containing carbon monoxide and hydrogen.

The syngas derived from the gasifier 50 (gasified syngas) is supplied to a gasifier heat recovery section 51 disposed above the gasifier 50 for heat recovery (cooling). The syngas to be cooled by the gasifier heat recovery section 51 is supplied to the cooling tower 52. Water such as industrial water is supplied to the gasifier heat recovery section 51 for cooling the syngas.

In the cooling tower 52, water 22 is sprayed to the syngas to be in contact with each other for vaporization. In the process, sensible heat of the syngas is converted into sensible heat and latent heat of steam. The syngas is then supplied to the dust remover 53 disposed downstream from the cooling tower 52. The syngas containing the water 22 (water-containing syngas) is derived from the cooling tower 52. That is, the cooling tower 52 disposed downstream from the gasifier 50 sprays the water 22 to the syngas to make the water 22 contained in the syngas.

A flow rate of the water 22 to be supplied to the cooling tower 52 is adjusted by a flow control valve 80. A thermometer 90 is disposed at an inlet side of the dust remover 53. The flow control valve 80 is controlled so that the temperature measured by the thermometer 90 becomes a specified value (predetermined value). Preferably, the specified value is set to approximately 300° C. from aspects of the highest usage temperature of the dust remover 53, and prevention of condensation of moisture contained in the syngas.

In the dust remover 53, particulates in the syngas in the form of unburnt char 5 (coal) are removed. A char lock hopper 54 for keeping the char 5 is disposed below the dust remover 53. A char feed hopper 55 for storing the char 5 is disposed below the char lock hopper 54. The char 5 is discharged via the char lock hopper 54 and the char feed hopper 55. The char 5 is supplied to the gasifier 50 while being carried by the carbon dioxide 3 for recycling. In other words, the dust remover 53 is disposed downstream from the cooling tower 52 for removing the particulates in the syngas.

The syngas with the char 5 removed (particulate-removed syngas) is supplied to the first water scrubber 56 via a gas-gas heat exchanger 70.

The first water scrubber 56 receives supply of washing water 7 that absorbs halogens contained in the syngas so that the halogens are removed therefrom. The halogen-containing washing water 7 is discharged from a lower section of the first water scrubber 56. In other words, the first water scrubber 56 disposed downstream from the dust remover 53 removes halogens contained in the syngas.

In the first water scrubber 56, steam contained in the syngas partially condenses. However, the washing water 7 supplied to the first water scrubber 56 is partially vaporized. Accordingly, concentration of steam in the syngas at an outlet side of the first water scrubber 56 becomes substantially equivalent to that of steam at an inlet side of the first water scrubber 56.

The syngas with halogens removed (halogen-removed syngas) is supplied to the shift reactor 57 via the gas-gas heat exchanger 70.

The gas-gas heat exchanger 70 exchanges heat between the syngas supplied from the dust remover 53 (syngas with the char 5 removed) and the syngas supplied from the first water scrubber 56 (syngas with halogens removed), and increases a temperature of the syngas supplied from the first water scrubber 56 to approximately 300° C.

The shift reactor 57 makes carbon monoxide in the syngas reacted with steam for conversion into carbon dioxide and hydrogen. In other words, the shift reactor 57 disposed downstream from the first water scrubber 56 partially converts carbon monoxide in the syngas into hydrogen.

The syngas supplied from the shift reactor 57 (mainly composed of carbon dioxide and hydrogen) is supplied to the second water scrubber 58 via a gas-gas heat exchanger 71. The second water scrubber 58 receives supply of washing water 8. A pipe arrangement for supplying the washing water 8 to the second water scrubber 58 is provided with a flow control valve 81 and a flowmeter 91. A flow rate of the washing water 8 to be supplied to the second water scrubber 58 is adjusted by the flow control valve 81. The flow control valve 81 is controlled so that the flow rate measured by the flowmeter 91 becomes a specified value (predetermined value).

A flowmeter (not shown) for measuring the flow rate of the syngas is disposed at an inlet side of the second water scrubber 58 to obtain a measurement value of the flowmeter. Using the measurement value, a flow rate (feed rate) of the washing water 8 to be supplied to the second water scrubber 58 is calculated, based on which the flow control valve 81 adjusts the flow rate of the washing water 8.

In the second water scrubber 58, ammonia in the syngas is dissolved in the washing water 8 so that ammonia is removed from the syngas. In other words, in the second water scrubber 58, the ammonia-containing syngas is brought into contact with the washing water 8 so that ammonia is dissolved therein, and separated from the syngas.

The ammonia-removed syngas (syngas mainly composed of carbon dioxide and hydrogen, having particulates, halogens, ammonia removed) is supplied to an absorber 59. The ammonia-containing washing water 8 is discharged from a lower section of the second water scrubber 58. In other words, the second water scrubber 58 disposed downstream from the shift reactor 57 removes ammonia from the syngas, and discharges the ammonia-containing washing water 8.

The absorber 59 is configured to remove hydrogen sulfide and carbon dioxide in the syngas. The absorber 59 receives supply of absorbent 10. Examples of the absorbent 10 include methyl diethanolamine and methanol. Examples of an absorbing method include a chemical absorption method using methyl diethanolamine, and a physical absorption method using methanol. The absorbent 10 that has absorbed hydrogen sulfide and carbon dioxide is discharged from a lower section of the absorber 59. In other words, the absorber 59 disposed downstream from the second water scrubber 58 provides gas for combustion by removing hydrogen sulfide and carbon dioxide in the syngas.

The carbon-based fuel gasification power generation system according to the first example is configured to remove particulates by the dust remover 53, halogens by the first water scrubber 56, and ammonia by the second water scrubber 58.

The syngas supplied from the absorber 59 is supplied to the combustor 60 as gas for combustion via the gas-gas heat exchanger 71. In other words, the syngas supplied from the absorber 59 has hydrogen sulfide and carbon dioxide removed, and is supplied to the combustor 60 as gas for combustion (mainly composed of hydrogen, having particulates, halogens, ammonia, carbon dioxide removed).

The gas-gas heat exchanger 71 exchanges heat between the syngas supplied from the shift reactor 57 and the syngas supplied from the absorber 59 to increase a temperature of the syngas supplied from the absorber 59.

Meanwhile, the combustor 60 receives supply of air for combustion. The air for combustion is derived from making moisture contained in the compressed air. The compressed air is generated by the compressor 61. Air 6 is supplied to the compressor 61, and compressed thereby. In other words, the compressor 61 compresses the air 6 to generate the compressed air. The compressed air is supplied from the compressor 61 to the humidifying tower 64. The combustor 60 burns the syngas (gas for combustion) supplied from the absorber 59, and the compressed air (air for combustion) humidified in the humidifying tower 64 to generate the combustion gas.

The humidifying tower 64 receives supply of water 9 such as industrial water. A pipe arrangement for supplying the water 9 to the humidifying tower 64 is provided with a flow control valve 83 and a flowmeter 92. A flow rate of the water 9 to be supplied to the humidifying tower 64 is adjusted by the flow control valve 83. The flow control valve 83 is controlled so that the flow rate measured by the flowmeter 92 becomes a specified value (predetermined flow rate). As described above, in the humidifying tower 64, the compressed air and the water 9 are in contact with each other for humidifying the compressed air. Air for combustion is derived from containing the water 9 in the compressed air. In other words, the humidifying tower 64 humidifies the compressed air generated by the compressor 61 to provide air for combustion.

Air for combustion fed from the humidifying tower 64 is supplied to the combustor 60 via a heat exchanger 73. The water 9 is contained in the compressed air to generate air for combustion at increased temperature. In other words, the humidified air for combustion at the increased temperature is generated.

The combustor 60 burns gas and air for combustion to generate high temperature combustion gas. The gas turbine 62 is driven upon supply of high temperature combustion gas. In other words, the gas turbine 62 is driven by the combustion gas derived from the combustor 60.

The generator 63 is connected to the gas turbine 62, and driven in association with operation of the gas turbine 62 for generating power. The gas turbine 62 discharges the exhaust gas. The compressor 61 is connected to the gas turbine 62 and the generator 63.

The heat exchanger 73 exchanges heat between air for combustion, fed from the humidifying tower 64 and exhaust gas discharged from the gas turbine 62, and increases a temperature of air for combustion, fed from the humidifying tower 64.

The exhaust gas from the gas turbine 62, having heat exchanged by the heat exchanger 73 is supplied to the water recovery device 65 via a heat exchanger 74.

The water recovery device 65 receives supply of water 25 such as industrial water to bring the water 25 into contact with the exhaust gas from the gas turbine 62. As a result, the temperature is decreased to cause moisture condensation in the exhaust gas from the gas turbine 62. The condensed moisture is recovered by the water recovery device 65.

The water recovery device 65 brings water 21 (stored in a lower section of the humidifying tower 64) supplied from the humidifying tower 64 to the water recovery device 65 into contact with the exhaust gas from the gas turbine 62 to lower the temperature of the exhaust gas from the gas turbine 62. Steam in the exhaust gas from the gas turbine 62 is recovered in the state of liquid. In other words, the water recovery device 65 recovers the moisture in the exhaust gas discharged from the gas turbine 62. The exhaust gas from the gas turbine 62 is discharged from a chimney 66.

The water recovery device 65 is provided with a water gauge 98 for measuring a water level of water 22 stored in a lower section of the water recovery device 65. The water recovery device 65 is further provided with a pipe arrangement for supplying water 25 to the water recovery device 65. The pipe arrangement includes a flow control valve 84 which adjusts the flow rate of the water 25 supplied to the water recovery device 65. The flow control valve 84 is controlled so that the water level measured by the water gauge 98 becomes a specified value (predetermined water level).

The heat exchanger 74 exchanges heat between the exhaust gas from the gas turbine 62 and the water 22 stored in the lower section of the water recovery device 65 to increase the temperature of the water 22 stored in the lower section of the water recovery device 65, and to lower the temperature of the exhaust gas from the gas turbine 62.

The water 22 in the water recovery device 65 is supplied to the cooling tower 52 via a water supply pipe arrangement 221 from the water recovery device 65 to the cooling tower 52 (water supply pipe arrangement for connecting the lower section of the water recovery device 65 and an upper section of the cooling tower 52). The water supply pipe arrangement 221 is provided with the flow control valve 80, and a pump 31 for supplying the water 22 in the water recovery device 65 to the cooling tower 52. The water 22 in the water recovery device 65 is supplied to the cooling tower 52 by the pump 31.

The humidifying tower 64 is provided with a water gauge 97 for measuring the water level of the water 21 stored in the lower section of the humidifying tower 64. A water supply pipe arrangement 211 is provided, extending from the humidifying tower 64 to the water recovery device 65 (water supply pipe arrangement for connecting the lower section of the humidifying tower 64 and an upper section of the water recovery device 65). The water 21 in the humidifying tower 64 is supplied to the water recovery device 65 via the water supply pipe arrangement 211 from the humidifying tower 64 to the water recovery device 65.

The water supply pipe arrangement 211 is provided with a flow control valve 85. The flow control valve 85 adjusts the flow rate of the water 21 in the humidifying tower 64, which is supplied to the water recovery device 65. The flow control valve 85 is controlled so that the water level measured by the water gauge 97 becomes a specified value (predetermined water level). The water supply pipe arrangement 211 is provided with a pump 30 for supplying the water 21 in the humidifying tower 64 to the water recovery device 65. The water 21 in the humidifying tower 64 is supplied to the water recovery device 65 by the pump 30.

The second water scrubber 58 is provided with a water gauge 96 for measuring a water level of the water 20 (ammonia-containing washing water 8) stored in the lower section of the second water scrubber 58. The water 20 in the second water scrubber 58 is supplied to the humidifying tower 64 via the water supply pipe arrangement 201 extending from the second water scrubber 58 to the humidifying tower 64 (water supply pipe arrangement for connecting the lower section of the second water scrubber 58 and an upper section of the humidifying tower 64), and the pipe arrangement for supplying the water 9 to the humidifying tower 64.

The water supply pipe arrangement 201 is provided with a flow control valve 82 for adjusting the flow rate of the water 20 supplied from the second water scrubber 58 to the humidifying tower 64. The flow control valve 82 is controlled so that the water level measured by the water gauge 96 becomes a specified value (predetermined water level). The water supply pipe arrangement 201 extending from the second water scrubber 58 to the humidifying tower 64 joins (is connected to) the pipe arrangement for supplying the water 9 to the humidifying tower 64 at a position upstream from the flowmeter 92 provided for the pipe arrangement.

In the first example, the water supply pipe arrangement 201 is provided, extending from the second water scrubber 58 to the humidifying tower 64 to supply the ammonia-containing water 20 from the second water scrubber 58 to the humidifying tower 64.

If the flow rate of the water 20 for humidifying the compressed air is deficient, the water 9 is filled. Specifically, if the flow rate of the water 20 measured by the flowmeter 92 is deficient, the flow control valve 83 is controlled to fill the water 9.

The pipe arrangement for supplying the water 9 to the humidifying tower 64 is connected to the water supply pipe arrangement 201, and provided with the flow control valve 83. The flowmeter 92 is disposed downstream (at the side of the humidifying tower 64) from a position at which the pipe arrangement and the water supply pipe arrangement 201 join, that is, between the position at which the pipe arrangement and the water supply pipe arrangement 201 join (are connected), and the humidifying tower 64. The flow control valve 83 is controlled so that the flow rate to be measured by the flowmeter 92 becomes a specified value (predetermined flow rate).

The water supply pipe arrangement 201 is connected to the pipe arrangement for supplying the water 9 to the humidifying tower 64. The pipe arrangement is provided with the flow control valve 83. A flowmeter A (not shown) for measuring the flow rate of the water 20 circulating through the water supply pipe arrangement 201 is disposed upstream (at the side of the second water scrubber 58) from a position at which the pipe arrangement and the water supply pipe arrangement 201 join (are connected). A pipe arrangement for supplying the compressed air from the compressor 61 to the humidifying tower 64 is provided with a flowmeter B (not shown) for measuring the flow rate of the compressed air circulating through the pipe arrangement. The flow rate (feed rate) of the water 9 is calculated using measurement values derived from the flowmeters A and B, based on which the flow control valve 83 adjusts the flow rate of the water 9.

As described above, the humidifying tower 64 brings the compressed air into contact with the water 20 to humidify the compressed air. Air for combustion is derived from making the water 20 contained in the compressed air. Ammonia contained in the water 20 is supplied to the combustor 60 together with air for combustion. In the combustor 60 at the temperature high enough to exceed 1300° C., for example, ammonia contained in the water 20 will be thermally decomposed into nitrogen and hydrogen. As reaction between hydrogen and oxygen generates steam, there is no need of wastewater treatment for removing ammonia contained in the water 20.

The wastewater treatment for removing ammonia requires a wastewater treatment facility where heat is exchanged between the water 20 and steam for temperature rise to remove ammonia from the water 20, and the ammonia-reduced water 20 is recycled.

The system according to the first example eliminates the wastewater treatment facility as described above to allow reduction in the cost for constructing the power generation system, and reduction in steam consumption and power for operating the wastewater treatment facility. This makes it possible to improve power generation efficiency of the power generation system.

As described above, the carbon-based fuel gasification power generation facility includes the gasifier 50 for gasifying carbon-based fuel using an oxidizer to provide syngas containing carbon monoxide and hydrogen, the cooling tower 52 disposed downstream from the gasifier 50 for spraying water to the syngas, the dust remover 53 disposed downstream from the cooling tower 52 for removing particulates in the syngas, the first water scrubber 56 disposed downstream from the dust remover 53 for removing halogens in the syngas, the shift reactor 57 disposed downstream from the first water scrubber 56 for partially converting carbon monoxide in the syngas into hydrogen, the second water scrubber 58 disposed downstream from the shift reactor 57 for removing ammonia in the syngas, and discharging water containing ammonia, the absorber 59 disposed downstream from the second water scrubber 58 for removing hydrogen sulfide and carbon dioxide in the syngas, and generating gas for combustion, the compressor 61 for compressing air to generate compressed air, the humidifying tower 64 for humidifying the compressed air to generate air for combustion, the combustor 60 for burning the gas for combustion and the air for combustion to generate combustion gas, the gas turbine 62 driven by the combustion gas generated by the combustor 60, the generator 63 connected to the gas turbine 62, and the water recovery device 65 for recovering moisture in the exhaust gas discharged from the gas turbine 62.

The water supply pipe arrangement is provided, extending from the second water scrubber 58 to the humidifying tower 64 to supply the ammonia-containing water from the second water scrubber 58 to the humidifying tower 64.

As a result, the carbon-based fuel gasification power generation system may be configured to remove ammonia from the syngas using the washing water 8, and effectively use the ammonia-containing washing water 8.

Second Example

A carbon-based fuel gasification power generation system according to a second example will be described.

Figure 2:
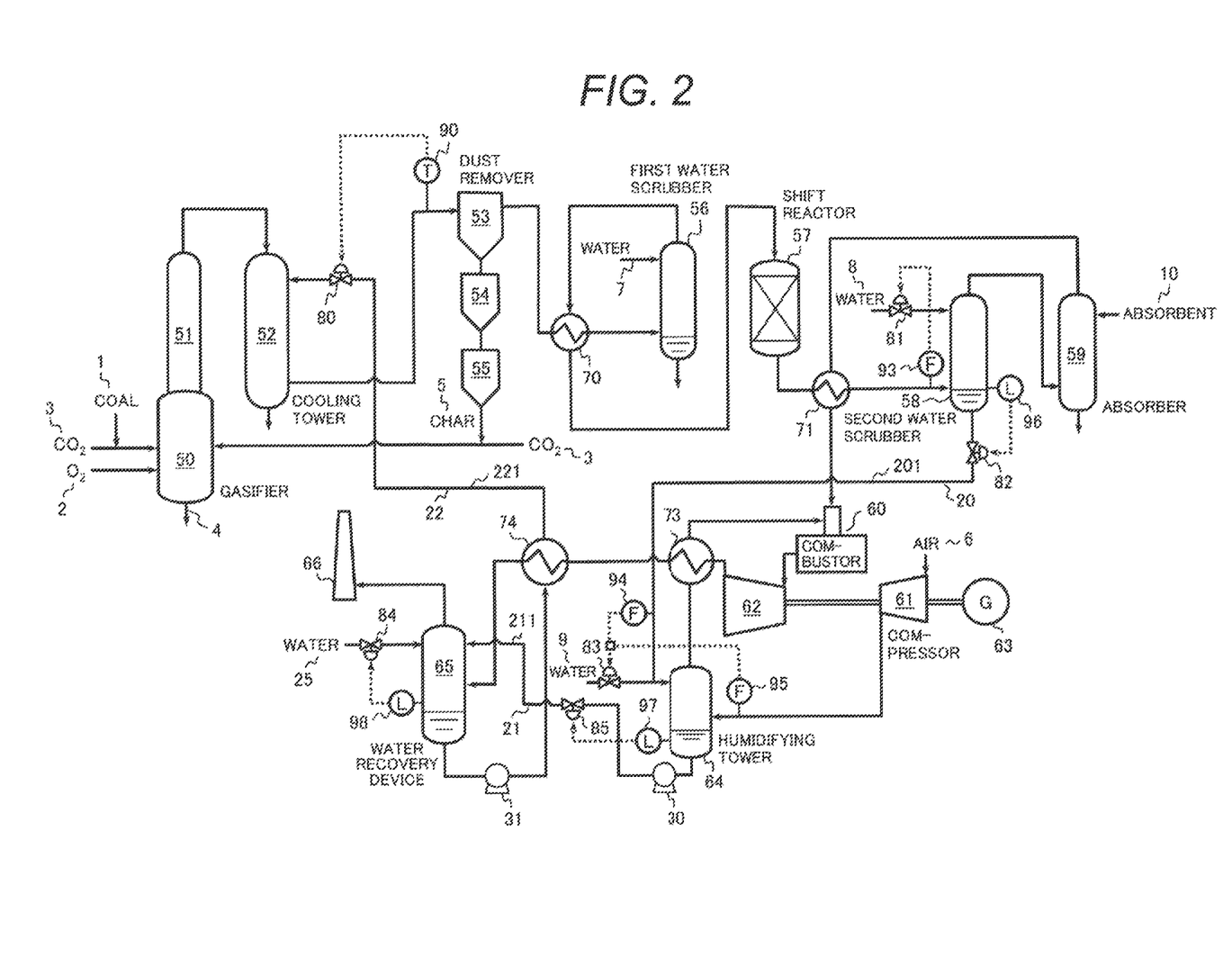
FIG. 2 is a diagram illustrating a system structure of a carbon-based fuel gasification power generation system according to a second example.

FIG. 2 is a diagram illustrating a system structure of the carbon-based fuel gasification power generation system according to the second example.

The carbon-based fuel gasification power generation system according to the second example is different from the one according to the first example in provision of flowmeters 93, 94, and 95 instead of the flowmeters 91 and 92.

In the second example, a pipe arrangement for supplying the syngas from the shift reactor 57 to the second water scrubber 58 is provided with the flowmeter 93 for measuring the flow rate of the syngas at the inlet side of the second water scrubber 58. Using the measured value of the flowmeter, a flow rate (feed rate) of the washing water 8 to be supplied to the second water scrubber 58 is calculated, based on which the flow control valve 81 adjusts the flow rate of the washing water 8.

In the second example, the water supply pipe arrangement 201 is provided with the flowmeter 94 for measuring the flow rate of the water 20 circulating through the water supply pipe arrangement 201 at a position upstream (at the side of the second water scrubber 58) from a position at which the pipe arrangement for supplying the water 9 to the humidifying tower 64 joins (is connected to) the water supply pipe arrangement 201. Furthermore, the pipe arrangement for supplying the compressed air from the compressor 61 to the humidifying tower 64 is provided with the flowmeter 95 for measuring the flow rate of the compressed air circulating through the pipe arrangement. The flow rate (feed rate) of the water 9 is calculated using measurement values derived from the flowmeters 94 and 95, based on which the flow control valve 83 adjusts the flow rate of the water 9.

If the flow rate of the water 20 is relatively low compared to the flow rate of the compressed air, the flow control valve 83 is adjusted to supply the water 9, or increase the flow rate of the water 9.

This makes it possible to optimize the feed rate of water for humidifying the compressed air, resulting in generation of appropriate amount of air for combustion.

Third Example

A carbon-based fuel gasification power generation system according to a third example will be described.

Figure 3:
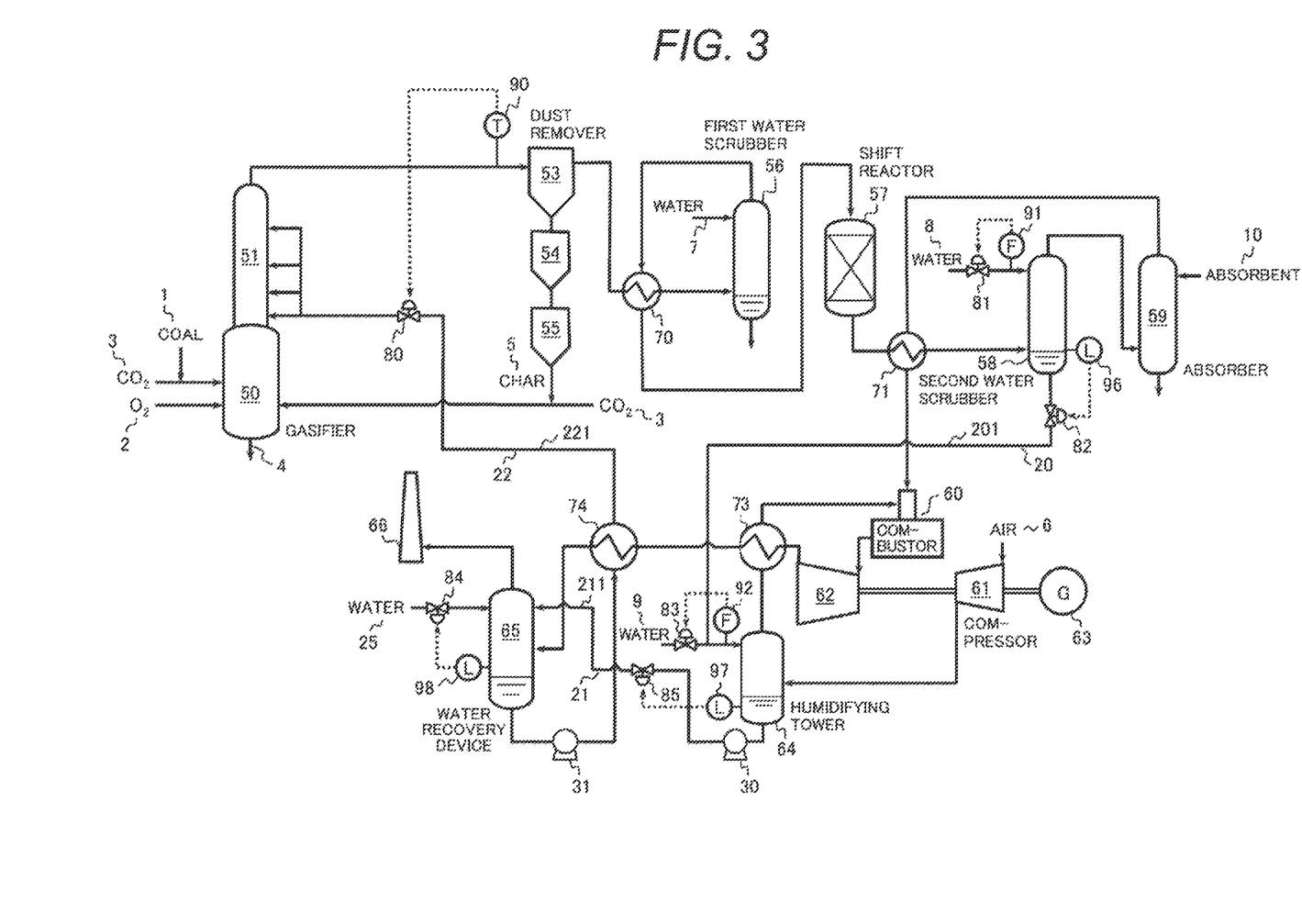
FIG. 3 is a diagram illustrating a system structure of a carbon-based fuel gasification power generation system according to a third example.

FIG. 3 is a diagram illustrating a system structure of the carbon-based fuel gasification power generation system according to the third example.

The carbon-based fuel gasification power generation system according to the third example is different from the one according to the first example in elimination of the cooling tower 52, and supply of water 22 to the gasifier heat recovery section 51.

In the third example, the gasifier heat recovery section 51 sprays the water 22 to the high-temperature syngas at an outlet side of the gasifier 50 to increase concentration of the steam in the syngas, and lower the temperature of the high-temperature syngas at the outlet side of the gasifier 50. In other words, the third example applies a so-called direct quench method to the carbon-based fuel gasification power generation system.

The flow control valve 80 provided for the water supply pipe arrangement 221 adjusts the flow rate of the water 22 to be supplied to the gasifier heat recovery section 51. A pipe arrangement for supplying the syngas from the gasifier heat recovery section 51 to the dust remover 53 is provided with the thermometer 90 at an inlet side of the dust remover 53. The flow control valve 80 is controlled so that the temperature to be measured by the thermometer 90 becomes a specified value (predetermined temperature).

The gasifier heat recovery section 51 includes a plurality of water spray nozzles (not shown) disposed at predetermined intervals so that the water 22 is supplied to a plurality of pipe arrangements distributedly. The distributed supply of the water 22 improves efficiency of each contact between the syngas and water at a position where the water is sprayed. This makes it possible to vaporize water before impingement of water against a wall surface of the gasifier heat recovery section 51.

As a result, the water consumption for cooling the syngas supplied to the gasifier heat recovery section 51 may be reduced, improving power generation efficiency of the power generation system.

Fourth Example

A carbon-based fuel gasification power generation system according to a fourth example will be described.

Figure 4:
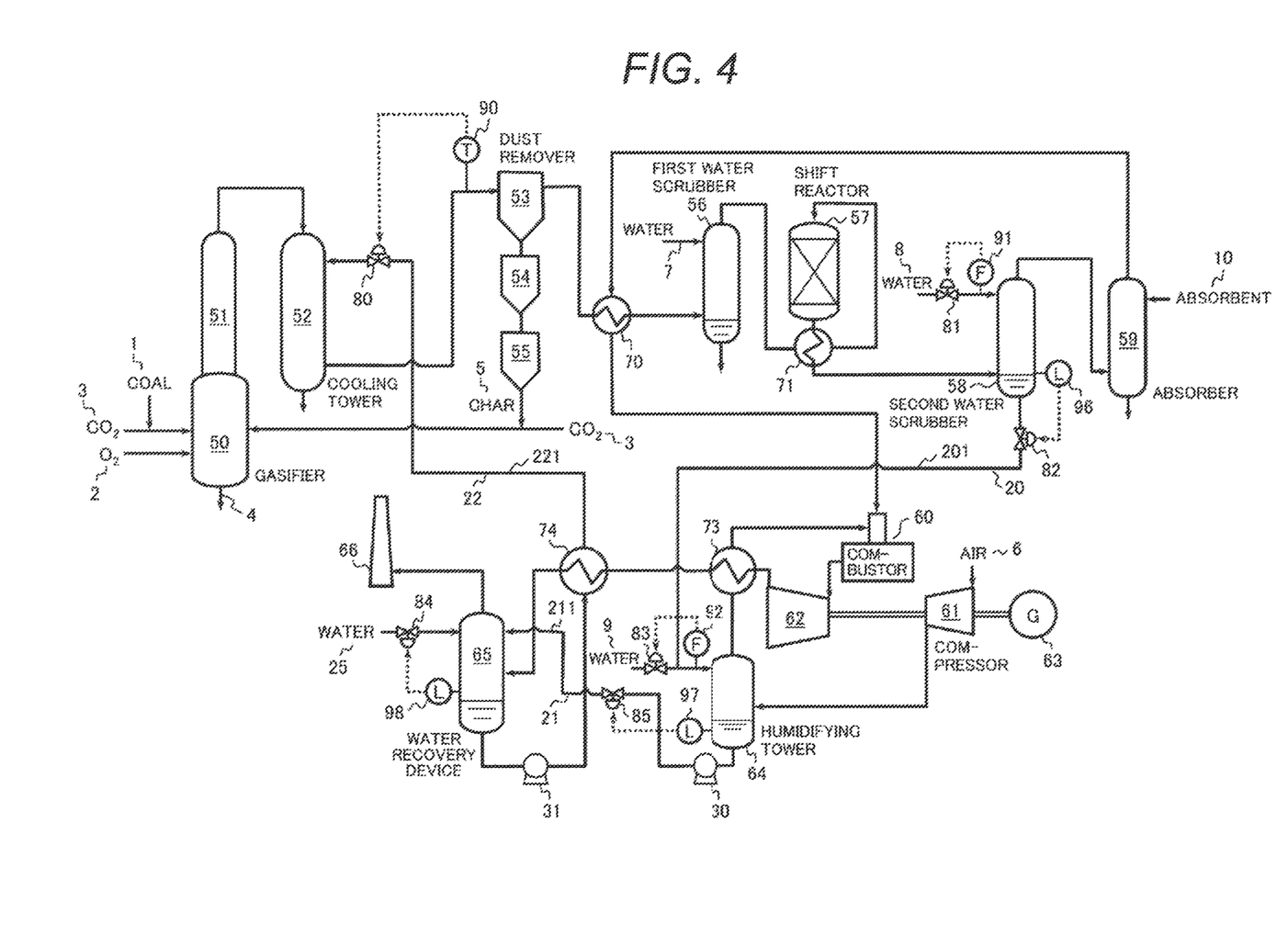
FIG. 4 is a diagram illustrating a system structure of a carbon-based fuel gasification power generation system according to a fourth example.

FIG. 4 is a diagram illustrating a system structure of the carbon-based fuel gasification power generation system according to the fourth example.

The carbon-based fuel gasification power generation system according to the fourth example is different from the one according to the first example in the point to be described below.

Namely, in the first example, the syngas is supplied from the first water scrubber 56 to the shift reactor 57 via the gas-gas heat exchanger 70, and the syngas is supplied from the absorber 59 to the combustor 60 via the gas-gas heat exchanger 71.

Meanwhile, in the fourth example, the syngas is supplied from the first water scrubber 56 to the shift reactor 57 via the gas-gas heat exchanger 71. The syngas is supplied from the absorber 59 to the combustor 60 via the gas-gas heat exchanger 70.

In the fourth example, the gas-gas heat exchanger 70 is used to exchange heat between the syngas at an outlet side of the dust remover 53 and the syngas at an outlet side of the absorber 59. In other words, the syngas at the outlet side of the dust remover 53 increases the syngas temperature at the outlet side of the absorber 59. The resultant syngas is supplied to the combustor 60 in the form of gas for combustion.

In the fourth example, the gas-gas heat exchanger 71 is used to exchange heat between the syngas at the outlet side of the first water scrubber 56 and the syngas at an outlet side of the shift reactor 57. In other words, the syngas at the outlet side of the shift reactor 57 increases the syngas temperature at the outlet side of the first water scrubber 56. The resultant syngas is supplied to the shift reactor 57.

In the fourth example as described above, each sensible heat of the syngas at the outlet side of the dust remover 53 and the syngas at the outlet side of the shift reactor 57 is effectively used.

This makes it possible to further increase the temperature of gas for combustion to be supplied to the combustor 60, and improve the power generation efficiency of the power generation system.

The present invention is not limited to the above-described examples, but includes various modifications. Specifically, the examples have been described in detail for readily understanding of the present invention. The present invention is not necessarily limited to the one provided with all structures as described above. It is possible to partially replace a structure of one of the examples with a structure of another example, or partially add the structure of one of the examples to the structure of another example. It is also possible to add, replace, and eliminate a part of the structure of one of the examples to, with, and from a part of the structure of another example.

REFERENCE SIGNS LIST

1 . . . coal,
2 . . . oxygen,
3 . . . carbon dioxide,
4 . . . slag,
5 . . . char,
6 . . . air,
7, 8 . . . washing water,
9, 20, 21, 22, 25 . . . water,
10 . . . absorbent,
30, 31 . . . pump,
50 . . . gasifier,
51 . . . gasifier heat recovery section,
52 . . . cooling tower,
53 . . . dust remover,
54 . . . char lock hopper,
55 . . . char feed hopper,
56 . . . first water scrubber,
57 . . . shift reactor,
58 . . . second water scrubber,
59 . . . absorber,
60 . . . combustor,
61 . . . compressor,
62 . . . gas turbine,
63 . . . generator,
64 . . . humidifying tower,
65 . . . water recovery device,
66 . . . chimney,
70, 71 . . . gas-gas heat exchanger,
73, 74 . . . heat exchanger,
80, 81, 82, 83, 84, 85 . . . flow control valve,
90 . . . thermometer,
91, 92, 93, 94, 95 . . . flowmeter,
96, 97, 98 . . . water gauge,
201, 211, 221 . . . water supply pipe arrangement

What is claimed is:

1. A carbon-based fuel gasification power generation system, comprising:
    a gasifier configured to gasify carbon-based fuel using an oxidizer and provide syngas containing carbon monoxide and hydrogen;
    a dust remover disposed downstream from the gasifier and configured to remove particulates in the syngas;
    a first water scrubber disposed downstream from the dust remover and configured to remove halogens in the syngas;
    a shift reactor disposed downstream from the first water scrubber and configured to partially convert carbon monoxide in the syngas into hydrogen;
    a second water scrubber disposed downstream from the shift reactor and configured to remove ammonia in the syngas and discharge water containing ammonia;
    an absorber disposed downstream from the second water scrubber and configured to remove hydrogen sulfide and carbon dioxide in the syngas and generate gas for combustion;
    a compressor configured to compress air to generate compressed air;
    a humidifying tower configured to humidify the compressed air to generate air for combustion;
    a combustor configured to burn the gas for combustion and the air for combustion and generate combustion gas;
    a gas turbine driven by the combustion gas generated by the combustor; and
    a generator connected to the gas turbine,
    wherein a water supply pipe arrangement extending from the second water scrubber to the humidifying tower is provided to supply the water containing ammonia from the second water scrubber to the humidifying tower.

2. The carbon-based fuel gasification power generation system according to claim 1, wherein a pipe arrangement for supplying washing water to the second water scrubber is provided with a flow control valve and a flowmeter.

3. The carbon-based fuel gasification power generation system according to claim 1, wherein the water supply pipe arrangement is provided with a flow control valve, and the second water scrubber is provided with a water gauge for measuring a water level of water stored in the second water scrubber.

4. The carbon-based fuel gasification power generation system according to claim 1,
    wherein the water supply pipe arrangement is connected to a pipe arrangement for supplying water to the humidifying tower;
    the pipe arrangement is provided with a flow control valve; and
    a flowmeter is disposed between a position at which the pipe arrangement and the water supply pipe arrangement are connected, and the humidifying tower.

5. The carbon-based fuel gasification power generation system according to claim 1, further comprising a water recovery device for recovering moisture in exhaust gas discharged from the gas turbine,
- wherein a water supply pipe arrangement extending from the humidifying tower to the water recovery device is disposed; and
- the water recovery device brings water stored in the humidifying tower into contact with the exhaust gas discharged from the gas turbine.

6. The carbon-based fuel gasification power generation system according to claim 5, wherein the water supply pipe arrangement is provided with a flow control valve, and the humidifying tower is provided with a water gauge for measuring a water level of water stored in the humidifying tower.

7. The carbon-based fuel gasification power generation system according to claim 6, wherein water stored in the water recovery device is supplied to a gasifier heat recovery section disposed above the gasifier to bring the syngas derived from the gasifier into contact with the water.

8. The carbon-based fuel gasification power generation system according to claim 5,
- wherein the water recovery device is provided with a pipe arrangement for supplying water to the water recovery device;
- the pipe arrangement is provided with a flow control valve; and
- the water recovery device is provided with a water gauge for measuring a water level of water stored in the water recovery device.

9. The carbon-based fuel gasification power generation system according to claim 5, wherein:
- a cooling tower is disposed downstream from the gasifier for spraying water to the syngas;
- the dust remover is disposed downstream from the cooling tower; and
- water stored in the water recovery device is supplied to the cooling tower to bring the syngas derived from the gasifier into contact with the water.

10. The carbon-based fuel gasification power generation system according to claim 1,
- wherein a pipe arrangement for supplying washing water to the second water scrubber is provided with a flow control valve; and
- the second water scrubber is provided with a flowmeter at an inlet side for measuring a flow rate of the syngas.

11. The carbon-based fuel gasification power generation system according to claim 1,
- wherein the water supply pipe arrangement is connected to a pipe arrangement for supplying water to the humidifying tower;
- the pipe arrangement is provided with a flow control valve;
- the water supply pipe arrangement is provided with a flowmeter for measuring a flow rate of water circulating through the water supply pipe arrangement; and
- a pipe arrangement for supplying the compressed air from the compressor to the humidifying tower is provided with a flowmeter for measuring a flow rate of the compressed air.

\* \* \* \* \*